Sept. 18, 1934.  T. F. BARNES  1,974,095

FRUIT BASKET

Filed Dec. 2, 1932

INVENTOR.
THOMAS F. BARNES
BY Charles S. Evans
HIS ATTORNEY

Patented Sept. 18, 1934

1,974,095

UNITED STATES PATENT OFFICE 1,974,095

FRUIT BASKET

Thomas F. Barnes, Los Angeles, Calif., assignor to Fibreboard Products Inc., San Francisco, Calif., a corporation of Delaware Application December 2, 1932, Serial No. 645,378

2 Claims. (Cl. 229—32)

My invention relates to an open container, and particularly to a basket for fruit and berries.

An object of my invention is the provision of a sanitary, ventilated fruit basket having no metal parts to bruise or discolor the fruit.

Another object of the invention is the provision of a basket having smooth inside walls without seams or edges to bruise or cut the fruit.

Another object of my invention is to provide a basket of simple construction and one which lends itself readily to manufacture by automatic machinery.

My invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing.

Figure 1:
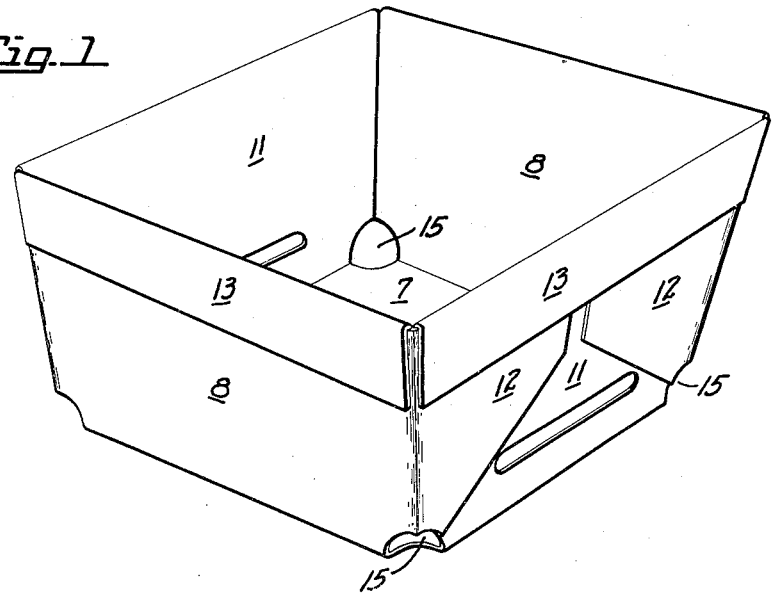
Figure 1 is a perspective view of my fruit basket.
Figure 2:
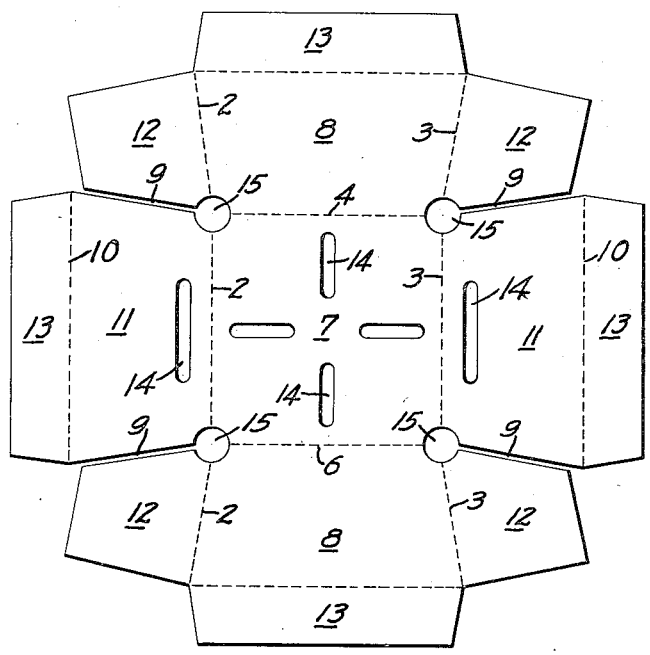
Figure 2 is a plan view of the sheet comprising my fruit basket as it appears before folding.

Broadly considered my invention comprises a fruit or berry container made from a single sheet of fibrous material such as paper board. Wooden baskets commonly used, sometimes impart a flavor to the fruit and the metal fasteners and reinforcing strips which are frequently a part of such construction are apt to bruise or discolor it. Furthermore, the solid bottom and sides offer no opportunity for air to circulate through the basket, which is of value in delaying decay. Frequently the fruit juice, dampening the wooden baskets, provides a medium for growth of mould and spores, and this spreads rapidly to the fruit.

The basket of my invention is preferably made from a sheet which has been treated with paraffine so that the fruit rests upon an impervious and sanitary surface. The paraffine makes the box moisture proof and germ proof and prevents any foreign tastes being imparted to the fruit. The basket is formed with a plurality of ventilating apertures spaced over the side walls and the bottom, so that air may enter freely to all portions of the contents in the basket. At the upper edge of each side an integral flap is provided which is turned down on the outside of the wall to reinforce the upper edge; and on two opposite sides these down turned flaps overlie the inturned wings from the adjacent sides so that the adjacent edges of the sides are locked together.

In detail my invention comprises a generally square sheet of paraffined paper or pulp board, having two longitudinal creases or fold lines 2 and 3, the center portions of which are parallel and the end portions of which flare slightly outwardly. Two parallel transverse creases 4 and 6 are provided which extend between the ends of the parallel portions of the longitudinal pieces and perpendicular thereto, thus forming a substantially square bottom portion 7 in the center of the sheet. The portions 8 lying between the flaring ends of the creases 2 and 3, when folded upwardly form two opposite sides of my basket.

The ends of the creases 4 and 6 terminate in slits or cuts 9 which flare outwardly in the same degree as the ends of the creases 2 and 3. These cuts divide the side portions 11 from the wing portions 12, the latter extending from the side portions 8, and being integral therewith along the creases 2 and 3.

In order to form the box out of the blank, the sides 8 and 11 are turned upwardly with the wings 12 extending inwardly on the outside of the sides 11. The narrow flaps 13 which are provided on the outer edge of each of the sides 8 and 11 are then folded downwardly on the outside along the crease 10; the flaps on the side 8 lying directly against the side and the flaps on the side 11 overlying the inturned wings 12. Preferably glue is used to secure the wings to the sides 11 and the flaps 13 against the sides. Thus, the sides are rigidly secured together along their adjacent edges and the wings 12 doubly secured between the sides and flaps. This construction also provides a smooth interior surface for the side walls as well as a reinforced and stiffened upper edge on each side.

Ventilating apertures 14 are formed in the sheet so that when it is folded the bottom and two or more sides adjacent the bottom are provided with apertures. I have found it desirable to make the apertures in the sides and bottom long and narrow so that one piece of fruit cannot obstruct the entire aperture. At each corner of the bottom of the box at the points of intersection of the creases 2 and 3, with the creases 4 and 6, circular apertures 15 are cut in the blank to facilitate folding of the box and to provide further ventilation. It will be noted that by placing a circular hole at the intersection of the creases as just explained, the aperture thus formed appears in the folded box in the bottom as well as in both adjacent sides.

This arrangement also permits the maximum strength in the sides of the box which are connected at the corners over substantially the whole height of the sides. The corner apertures also permit free drainage of the box when the berries are washed, as is frequently required under certain conditions.

The basket of my invention has been particularly designed for manufacture by automatic machinery. The scoring for example is preferably done by a single scoring die on one side of the stock only. It will be noted that in the assembled basket the fold 10 between each flap 13 and its adjoining side is substantially a 180 degree fold, while all the other folds at the corners and along the bottom are less than 90 degrees. The scoring is therefore all disposed on that side of the sheet which best facilitates the making of the fold of greatest degree, namely, fold 10 between the flap 13 and the adjoining sides.

When the cutting and creasing of the blank has been completed it is run between applicator rolls to apply paraffine after which it is heat treated under pressure so that the sheet is evenly impregnated with the paraffine. This procedure insures uniform saturation, all edges as well as the body of the sheet being rendered impervious to moisture.

By regulation of the amount of paraffine saturant and the use of heat to drive it into the fibers of the stock, subsequent gluing which is also accomplished by the automatic machine, is not interfered with. The glue is applied on the surface of the sheet which becomes the outside of the basket so that the adhesive does not come in contact with the fruit which might be affected by it. Obviously too, if the adhesive could be reached by the fruit juices they would have a tendency to loosen or dissolve it. It is necessary to apply glue only to the back of the flaps 13 and that portion of the back of the sides 11 which are covered by the wings 12.

After the gluing step is completed the blank passes into another mechanism which folds it and delivers the basket into a long tube which holds it in folded position while the adhesive sets. As the baskets are fed into the one end of the tube, those already in it are forced along until they emerge at the other end, a finished product ready for packing and shipping.

I claim:

1. A box plank comprising a generally square sheet of fibreboard, two longitudinal creases extending across said sheet the center portions of said creases being parallel and the end portions flaring slightly outwardly, two parallel transverse creases extending between the ends of the parallel longitudinal creases and perpendicular thereto, said transverse creases terminating in cuts flaring outwardly in the same degree as the ends of the longitudinal creases; said cuts and creases dividing the sheet into a central bottom portion with flaps forming the sides extending directly from each side of the bottom portion, and wings on oppositely disposed flaps; a crease extending across each side flap adjacent its outer edge to form a narrow flap; said blank having elongated ventilating apertures extending radially from the central portion of the bottom wall toward the mid portions of said side flaps whereby a continuous width of sheet material is retained in the bottom and extending from corner to corner to reinforce the bottom structure.

2. A fruit basket comprising a single sheet having a substantially rectangular center portion forming a bottom on which the basket rests, a flap integral with and extending upwardly directly from each side of said bottom to form the sides of the basket, wings extending from each side of two oppositely disposed flaps and adapted to overlie and reinforce the outside of the intervening flaps, the bottom edges of said wings sloping upwardly from the corners of the basket to expose a portion of the underlying side, said sides having long narrow apertures in said exposed portion, each corner of the bottom and its adjacent sides having a circular aperture therein, and a narrow flap integral with each side flap and extending across and adhesively united to the upper outer edge thereof to reinforce the upper edge of the basket,

THOMAS F. BARNES.